United States Patent
Saleh et al.

(10) Patent No.: US 12,217,180 B2
(45) Date of Patent: *Feb. 4, 2025

(54) TRAINING TEXT SUMMARIZATION NEURAL NETWORKS WITH AN EXTRACTED SEGMENTS PREDICTION OBJECTIVE

(71) Applicant: Google LLC, Mountain View, CA (US)

(72) Inventors: Mohammad Saleh, Santa Clara, CA (US); Jingqing Zhang, London (GB); Yao Zhao, San Carlos, CA (US); Peter J. Liu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,950

(22) Filed: Oct. 12, 2023

(65) Prior Publication Data

US 2024/0185065 A1    Jun. 6, 2024

Related U.S. Application Data

(63) Continuation of application No. 17/140,863, filed on Jan. 4, 2021, now Pat. No. 11,803,751, which is a
(Continued)

(51) Int. Cl.
*G06N 3/08* (2023.01)
*G06F 40/30* (2020.01)
*G06N 3/045* (2023.01)

(52) U.S. Cl.
CPC .............. *G06N 3/08* (2013.01); *G06F 40/30* (2020.01); *G06N 3/045* (2023.01)

(58) Field of Classification Search
CPC ........................................................ G06N 3/08
(Continued)

(56) References Cited

U.S. PATENT DOCUMENTS 5,778,397 A * 7/1998 Kupiec ................ G06F 16/345
715/243
5,918,240 A * 6/1999 Kupiec ................ G06F 16/345
715/243

(Continued)

OTHER PUBLICATIONS

Dai et al., "Semi-supervised sequence learning", Advances in Neural Information Processing Systems, 2015, 9 pages.
(Continued)

*Primary Examiner* — Reza Nabi
(74) *Attorney, Agent, or Firm* — Fish & Richardson P.C.

(57) ABSTRACT

Methods, systems, and apparatus, including computer programs encoded on computer storage media, for training a text summarization neural network. One of the methods includes pre-training the text summarization neural network including learning values of a plurality of network parameters through self-supervised learning using unlabeled data comprising unlabeled first texts, the pre-training including: obtaining an unlabeled first text comprising a plurality of segments; selecting one or more of the plurality of segments; processing a masked first text that excludes the one or more selected segments to generate a prediction of the one or more selected segments; and determining, based on a difference between the prediction and the one or more selected segments, an update to the current values of the plurality of network parameters; adapting the pre-trained text summarization neural network for a specific text summarization task using labeled data comprising second texts and respective summaries of the second texts.

18 Claims, 5 Drawing Sheets

Related U.S. Application Data continuation of application No. 16/869,419, filed on May 7, 2020, now Pat. No. 10,885,436.

(58) Field of Classification Search
USPC .......................................................... 715/254
See application file for complete search history.

(56) References Cited

U.S. PATENT DOCUMENTS

| | | | | |
|---|---|---|---|---|
| 6,961,954 | B1* | 11/2005 | Maybury | G11B 27/28 |
| | | | | 725/53 |
| 10,019,525 | B1* | 7/2018 | Boni | G06F 16/345 |
| 10,402,495 | B1* | 9/2019 | Rush | G10L 15/197 |
| 10,691,737 | B2* | 6/2020 | Parikh | G06F 16/345 |
| 2002/0067858 | A1* | 6/2002 | Lazaridis | G06T 7/00 |
| | | | | 382/228 |
| 2004/0207656 | A1* | 10/2004 | Lee | G06K 9/3241 |
| | | | | 715/723 |
| 2006/0058609 | A1* | 3/2006 | Olstad | A61B 8/14 |
| | | | | 600/407 |
| 2007/0106659 | A1* | 5/2007 | Lu | G06F 16/3326 |
| 2007/0282867 | A1* | 12/2007 | McAllister | G06Q 30/02 |
| 2013/0138435 | A1* | 5/2013 | Weber | G10L 25/57 |
| | | | | 704/231 |
| 2017/0060826 | A1* | 3/2017 | Das | G06F 40/279 |
| 2017/0124184 | A1* | 5/2017 | Podgorny | G06N 7/005 |
| 2018/0129634 | A1* | 5/2018 | Sivaji | G06F 16/345 |
| 2018/0240013 | A1* | 8/2018 | Strope | G06F 16/335 |
| 2018/0268307 | A1* | 9/2018 | Kobayashi | G06N 20/00 |
| 2018/0300400 | A1* | 10/2018 | Paulus | G06N 3/08 |
| 2018/0329694 | A1* | 11/2018 | Liu | G06F 8/36 |
| 2019/0042551 | A1* | 2/2019 | Hwang | G06N 3/08 |
| 2019/0155877 | A1* | 5/2019 | Sharma | G06F 40/253 |
| 2019/0179916 | A1* | 6/2019 | Sivaji | G06F 3/0481 |
| 2019/0205395 | A1* | 7/2019 | Bonin | G06F 40/30 |
| 2019/0278835 | A1* | 9/2019 | Cohan | G06N 3/0454 |
| 2019/0325066 | A1* | 10/2019 | Krishna | G06F 16/313 |
| 2019/0362020 | A1* | 11/2019 | Paulus | G06N 3/04 |
| 2020/0125639 | A1* | 4/2020 | Doyle | G06K 9/6267 |
| 2020/0125928 | A1* | 4/2020 | Doyle | G06N 20/00 |
| 2020/0126533 | A1* | 4/2020 | Doyle | G06F 40/30 |
| 2020/0134074 | A1* | 4/2020 | Mankovskii | G06F 16/24573 |
| 2020/0134091 | A1* | 4/2020 | Feigenblat | G06F 16/345 |
| 2020/0134103 | A1* | 4/2020 | Mankovskii | G06F 16/904 |
| 2020/0159755 | A1* | 5/2020 | Iida | G06F 16/00 |
| 2020/0175229 | A1* | 6/2020 | Iwakura | G06N 7/005 |
| 2020/0210647 | A1* | 7/2020 | Panuganty | G06F 16/24578 |

OTHER PUBLICATIONS

Devlin et al., "BERT: Pre-training of deep bidirectional transformers for language understanding", Proceedings of the 2019 Conference of the North American Chapter of the Association for Computational Linguistics: Human Language Technologies, 2019, 16 pages.

Dong et al., "Unified language model pre-training for natural language understanding and generation", 33rd Conference on Neural Information Processing Systems, 2019, 13 pages.

Joshi et al., "SpanBERT: Improving pre-training by representing and predicting spans", arXiv, 2019, 12 pages.

Khandelwal et al., "Sample efficient text summarization using a single pre-trained transformer", arXiv, 2019, 7 pages.

Lewis et al., "Bart: Denoising sequence-to-sequence pre-training for natural language generation, translation, and comprehension", arXiv, 10 pages.

Lin et al., "Abstractive Summarization: A Survey of the State of the Art", Proceedings of the AAAI Conference on Artificial Intelligence, 8 pages.

Radford et al., "Improving language understanding by generative pre-training", Amazon News, 2018, 12 pages.

Radford et al., "Language models are unsupervised multitask learners", OpenAI, 2018, 24 pages.

Raffel et al., "Exploring the limits of transfer learning with a unified text-to-text transformer", arXiv, 2019, 53 pages.

Ramachandran et al., "Unsupervised pretraining for sequence to sequence learning", Proceedings of the 2017 Conference on Empirical Methods in Natural Language Processing, 2017, 9 pages.

Rothe et al., "Leveraging pre-trained checkpoints for sequence generation tasks", arXiv, 2019, 12 pages.

Song et al., "Mass: Masked sequence to sequence pre-training for language generation", International Conference on Machine Learning, 2019, 11 pages.

Yang et al., "XLnet: Generalized autoregressive pretraining for language understanding", Advances in Neural Information Processing Systems, 2019, 11 pages.

* cited by examiner

402 — INVITATION ONLY We are very excited to be co-hosting a major drinks reception with our friends at Progress. This event will sell out, so make sure to register at the link above. Speakers include Rajesh Agrawal, the London Deputy Mayor for Business, Alison McGovern, the Chair of Progress, and Seema Malhotra MP. Huge thanks to the our friends at the ACCA, who have supported this event. The Labour Business Fringe at this year's Labour Annual Conference is being co-sponsored by Labour in the City and the Industry Forum. Speakers include John McDonnell, Shadow Chancellor, and Rebecca Long-Bailey, the Shadow Chief Secretary to the Treasury, and our own Chair, Kitty Ussher. Attendance is free, and refreshments will be provided.

404 — Huge thanks to the our friends at the ACCA, who have supported this event.
Attendance is free, and refreshments will be provided.

406 — INVITATION ONLY We are very excited to be co-hosting a major drinks reception with our friends at Progress. This event will sell out, so make sure to register at the link above.

408 — Speakers include Rajesh Agrawal, the London Deputy Mayor for Business, Alison McGovern, the Chair of Progress, and Seema Malhotra MP. Speakers include John McDonnell, Shadow Chancellor, and Rebecca Long-Bailey, the Shadow Chief Secretary to the Treasury, and our own Chair, Kitty Ussher.

TRAINING TEXT SUMMARIZATION NEURAL NETWORKS WITH AN EXTRACTED SEGMENTS PREDICTION OBJECTIVE

CROSS-REFERENCE TO RELATED APPLICATION

This is a continuation of U.S. application Ser. No. 17/140,863, filed on Jan. 4, 2021, which is a continuation of U.S. application Ser. No. 16/869,419, filed on May 7, 2020, now U.S. Pat. No. 10,885,436, the disclosures of which are considered part of and are incorporated by reference in the disclosure of this application.

BACKGROUND

This specification relates to training neural networks to perform text summarization tasks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Text summarization refers to techniques that aim to generate, from a corpus of text, a more condensed text description that encapsulates the most important information from the corpus of text. The size of the generated summaries depends on the processing pipeline and machine-learning models that are involved. Text summaries can be automatically generated by various types of machine-learning models, including neural networks, that take as input a portion of text and generate as output a summary of the text.

SUMMARY

This specification describes a system implemented as computer programs on one or more computers in one or more locations that trains a neural network to automatically generate summarizations from text documents. The exact size of the summarization depends on the implementations of the neural networks that are involved, but typically, each generated summarization is between 5 and 100 words in length, whereas each text document is typically thousands or millions of words in length.

Particular embodiments of the subject matter described in this specification can be implemented so as to realize one or more of the following advantages.

The system can pre-train a text summarization neural network using unlabeled text documents which are publicly available or otherwise easily obtainable in massive volumes. The pre-trained text summarization neural network can then be used to effectively adapt to a specific text summarization task using orders of magnitude less data than was used to pre-train the network. For example, while pre-training the network may utilize billions of unlabeled text documents, adapting the network for a specific task may require merely a few thousand labeled text documents.

This two-stage process enables technological use cases that were previously not possible. First, high quality summaries can be generated for documents under certain categories for which associated ground-truth summaries are expensive or difficult to collect for use in supervised learning training of the network. For example, concise and accurate summaries can be generated for legislative bills or corporate emails. Second, because a significantly reduced amount of labeled data is needed, the adaptation process is much less computationally intensive than the pre-training process. The adaptation process therefore can be performed by consumer hardware of end users, e.g., a desktop or laptop computer, rather than being performed in a datacenter.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a neural network to automatically generate summarizations from large corpuses of texts.

Figure 1:
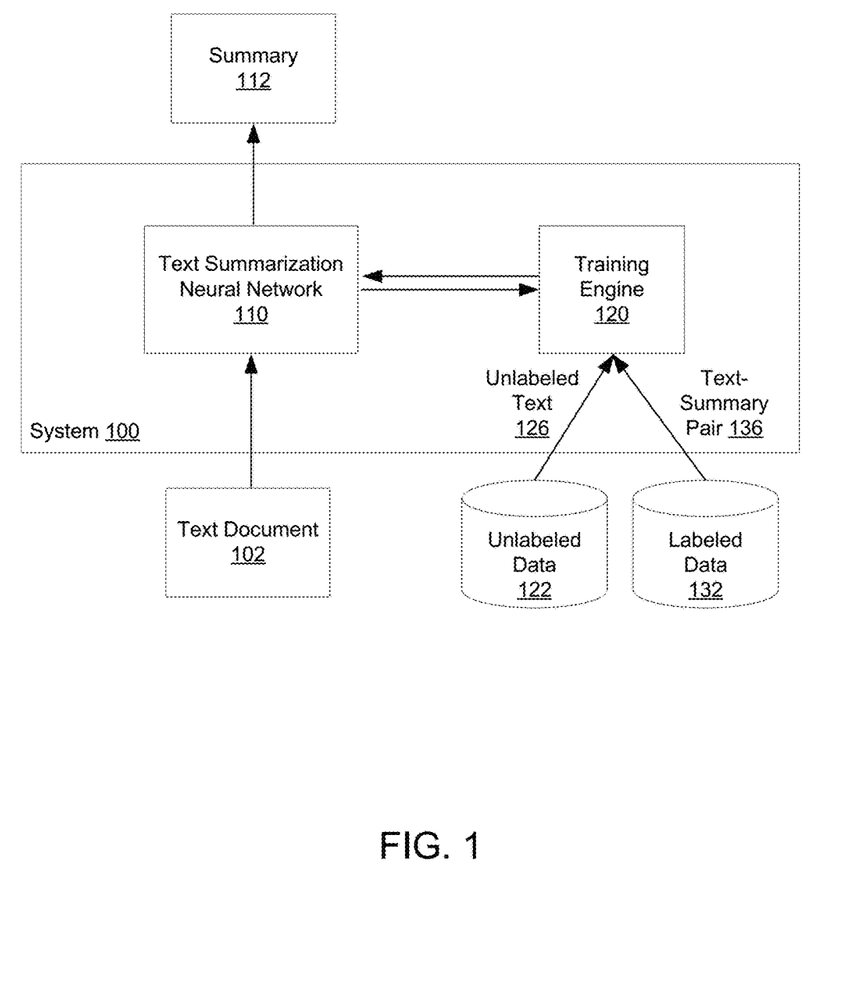
FIG. 1 shows an example system.

FIG. 1 shows an example system 100. The system 100 is an example of a system implemented as computer programs on one or more computers in one or more locations, in which the systems, components, and techniques described below are implemented.

The system 100 includes a text summarization neural network 110 and a training engine 120. The text summarization neural network 110 can receive an input text document 102 and generate a summary 112 based on the received input text document 102 and on values of the parameters of the text summarization neural network 110.

In the context of this description, a "text document" refers to a collection of text of any type. A text document may have one or more pages, partitions, segments, e.g., sentences, clauses, phrases, or other components, as appropriate to its content and type. For example, text documents can include web pages, emails, news articles, scientific publications, legal documents, and the like. A "summary" refers to a more condensed text description that encapsulates the most important information from the corpus of text. The size of a summary, i.e., the number of words in the summary, is smaller, and usually much smaller, than that of a text document. A summary can be either extractive or abstractive. In contrast to extractive summary which merely copies informative fragments from the text document, abstractive summary may include novel words that do not appear in the text document.

In general, the text summarization neural network 110 can be any appropriate neural network that is capable of generating summaries from text documents. Example neural network architectures are described in greater detail in Lin, Hui & Ng. Vincent. (2019). *Abstractive Summarization: A Survey of the State of the Art*. Proceedings of the AAAI Conference on Artificial Intelligence. 33. 9815-9822. 10.1609/aaai.v33101.33019815.

The training engine 120 in the system 100 trains the text summarization neural network 110 to determine trained values of the network parameters from initial values of the model parameters using an iterative training process. At each iteration of the training process, the training engine 120 determines a parameter value update to the current network parameter values and then applies the update to the current network parameter values.

One of the fundamental limitations of training a text summarization neural network 110 is that training the neural network 110 to generate high-quality summaries typically requires large, labeled training datasets. A labeled training dataset includes text documents and corresponding ground-truth summaries of the text documents. In addition, applying the text summarization neural network 110 in different use cases, i.e., to generate summaries for text documents under different categories, usually requires different training datasets. Ideally, for a given use case, the training engine needs multiple millions of pairs of text documents and human-written summaries in order to train the network 110 to generate meaningful and linguistically fluent summaries. This amount of data is expensive and cumbersome to obtain and curate in general, and there are many use cases for which this volume of training data is impractical or impossible to obtain.

Thus, to improve the effectiveness of the training, the training engine 120 trains the text summarization neural network 110 using a two-stage process: pre-training and adaptation. During the pre-training stage, the training engine 120 trains the network 110 through self-supervised learning on training data that is derived from an unlabeled dataset 122 which includes a plurality of unlabeled text documents 126. An unlabeled text document generally refers to a text document for which no ground-truth summary is available. In the absence of such ground-truth summaries, the system employs a self-supervised learning scheme which, e.g., unlike conventional supervised learning that relies on using the ground-truth labels as training objectives, allows for determining training objectives from the unlabeled text documents by the system itself. Specifically, for an unlabeled text document, pre-training with self-supervised learning involves extracting (i.e., masking out) one or more segments from the unlabeled text document and then training the text summarization neural network to predict the extracted segments based on processing the remaining, unmasked portion of the unlabeled text document.

After the pre-training, the training engine 120 then makes use of a labeled dataset 132 that includes a plurality of pairs 136 of text documents and summaries to adapt the pre-trained network to a particular use case, for example, to a specific text summarization task where the network will be used in generating summaries for a specific category of text documents.

Generally the data used for the adaptation process can be orders of magnitude smaller than data used for the pre-training process. In some implementations, the unlabeled dataset 122 includes billions of unlabeled text documents, while the labeled dataset 132 includes merely a few thousand pairs of text documents and summaries.

Once the two-stage process has completed, the system 100 can provide data specifying the trained text summarization neural network 110, e.g., the trained values of the parameters of the text summarization neural network and data specifying the architecture of the text summarization neural network, to another system, e.g., a second system, for use in processing new text documents. Instead of or in addition to providing the data specifying the trained network, the system 100 can use the trained text summarization neural network 110 to process new text documents 102 and generate respective summaries 112.

Figure 2:
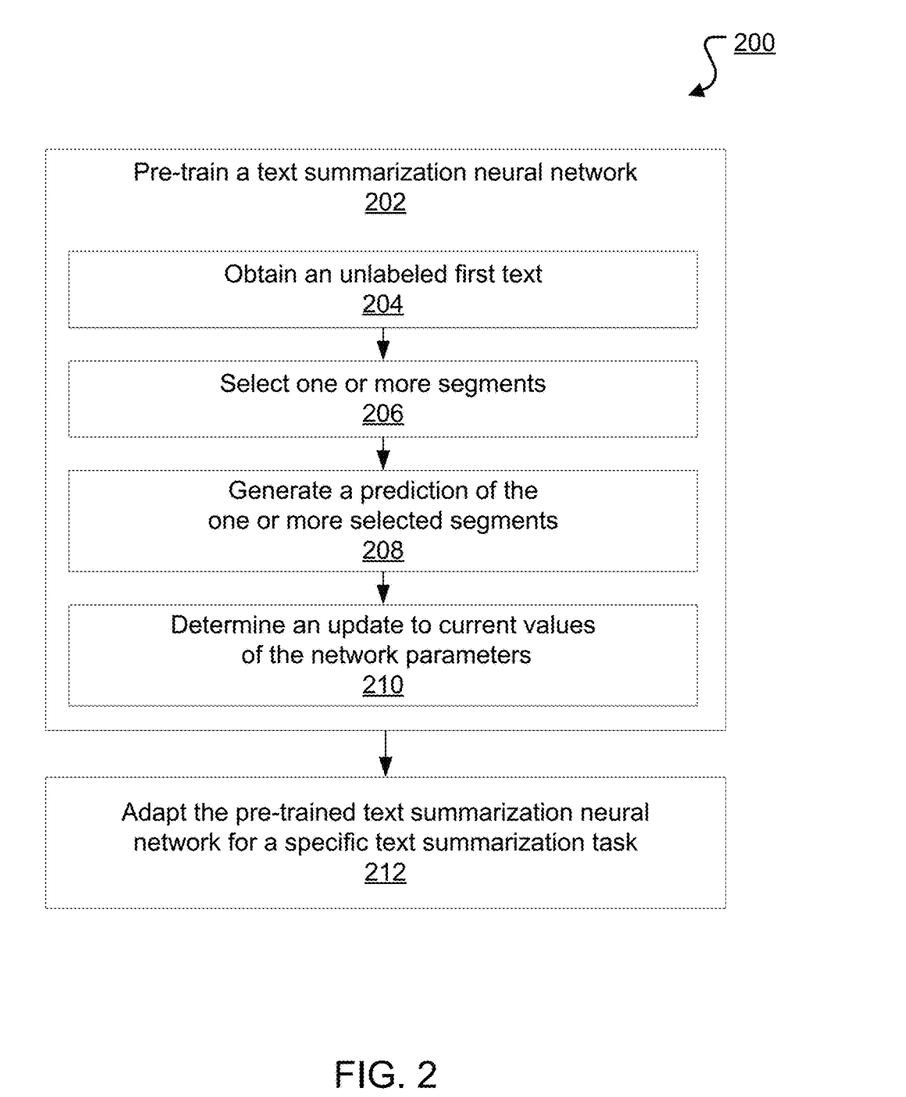
FIG. 2 is a flow diagram of an example process for pre-training and adapting a text summarization neural network for a specific use case.

FIG. 2 is a flow diagram of an example process 200 for pre-training and adapting a text summarization neural network for a specific use case. For convenience, the process 200 will be described as being performed by a system of one or more computers located in one or more locations. For example, a system, e.g., the system 100 of FIG. 1, appropriately programmed in accordance with this specification, can perform the process 200.

The system pre-trains a text summarization neural network (202) using unlabeled data that includes a plurality of unlabeled first text documents. As will be described in more detail below, the pre-training process involves learning parameter values of the text summarization neural network through self-supervised learning training.

In general, the system can repeatedly perform the following steps 204-210 for each of the plurality of unlabeled first text documents.

The system obtains an unlabeled first text document (204) that includes a plurality of segments, e.g., sentences, clauses, or other multi-word phrases. Each segment, in turn, includes a set of one or more words that are grammatically linked. As described above, an unlabeled text document generally refers to a text document without associated ground-truth summary, or in some cases, a text document for which the associated ground-truth summary is not accessible to the system during the pre-training.

The system selects one or more of the plurality of segments in the unlabeled first text document (206). The system can select the segments in any of a variety of ways.

Figure 4:
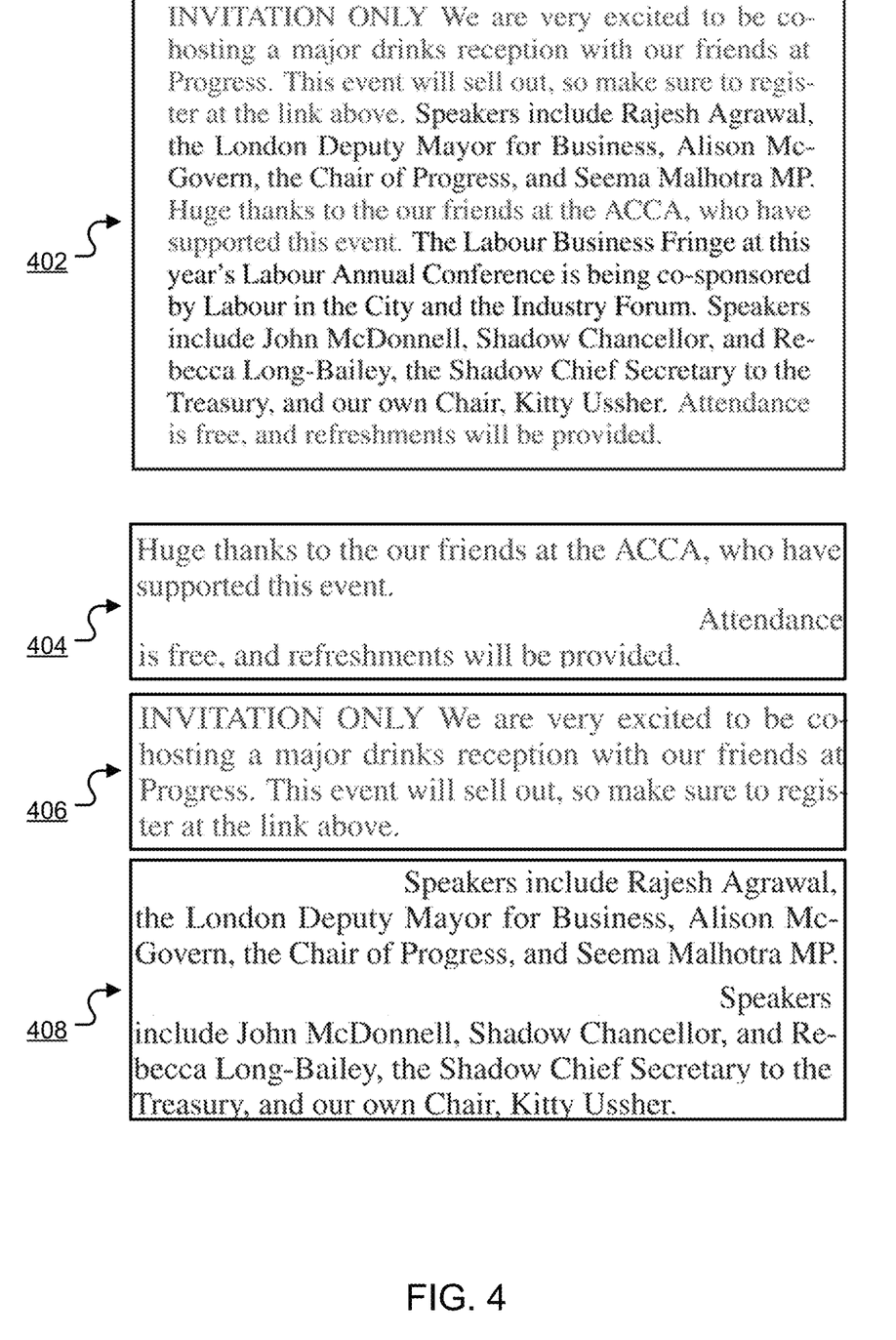
FIG. 4 is an illustration of different segments that are selected from an example text document.

FIG. 4 is an illustration of different segments that are selected from an example unlabeled text document 402.

For example, as depicted in 404, the system can select the one or more segments from the example unlabeled text document 402 with some measure of randomness, i.e., by randomly sampling one or more segments from the example unlabeled text document which in turn includes multiple segments.

As another example, the system can select the one or more segments from the unlabeled first text document based on respective positions of the segments in the unlabeled first text document. For example, the system can select segments located at the beginning, ending, or some other predetermined locations of the unlabeled first text document. As depicted in 406, the system selects the first two segments from the example unlabeled text document 402.

As yet another example, the system can select the one or more segments from the unlabeled first text document based on respective importance measures of the segments in the unlabeled first text document. That is, for each of the plurality of segments, the system first evaluates, e.g., by computing a ROUGE1-FI score, an importance measure of the segment which characterizes a relative importance of the segment with respect to the remaining segments in the unlabeled first text document. The system then selects the one or more segments with the highest importance measures. As depicted in 408, the system selects two relatively important segments from the example unlabeled text document 402.

The system processes a masked first text document that excludes (i.e., masks out) the one or more selected segments to generate a prediction of the one or more selected segments (208). The system can generate the masked first text document by replacing the one or more selected segments in the unlabeled first text document with first mask tokens. For example, the first mask tokens can be zero, negative or positive infinity, or some other predetermined numeric values. The system then process data representing the masked first text document using the text summarization neural network and in accordance with current values of the plurality of network parameters to generate a network output that specifies a prediction of the one or more selected segments. For example, the output generated by the network may be a sequence of text, or encoded (i.e., numeric) representations of the sequence of text. Collectively, the sequence of text define the network prediction of the one or more selected segments.

The system determines, based on a difference between the prediction and the one or more selected segments, an update to the current values of the plurality of network parameters (210). Specifically, the system can do so by evaluating a pre-training objective function that measures a difference between the prediction and the one or more selected segments with respect to, e.g., perplexity or ROUGE metric. The system then determines the update based on a computed gradient of the pre-training objective function. In particular, the system computes the gradient of the pre-training objective function with respect to the parameters of the text summarization neural network.

The system then proceeds to update the current parameter values based on the gradient and by using an appropriate gradient descent optimization technique, e.g., stochastic gradient descent, RMSprop or Adam technique. Alternatively, the system only proceeds to update the current parameter values once the steps 204-210 have been performed for an entire mini-batch of unlabeled first text documents. A mini-batch generally includes a fixed number of unlabeled first text documents, e.g., 16, 64, or 256. In other words, the system combines, e.g., by computing a weighted or unweighted average of, respective gradients that are determined during the fixed number of iterations of the steps 204-210 and proceeds to update the current parameter values based on the combined gradient.

The system can repeatedly perform the steps 204-210 until a pre-training termination criterion is satisfied, e.g., after the steps 204-210 have been performed a predetermined number of times or after the gradient of the pre-training objective function has converged to a specified value.

Because in this way the text summarization network is trained with respect to training targets that are determined by the system itself, i.e., instead of known, ground-truth summaries from the training data, the pre-training process can be referred to as "self-supervised learning" training.

After determining that the pre-training termination criterion is satisfied, the system can proceed to adapt the pre-trained text summarization neural network for a specific text summarization task (212). As described above, the adaptation process uses labeled data that is dedicated to the specific text summarization task and that includes second text documents and respective known summaries of the second text documents. That is, the system can fine-tune the network parameters by retraining with respect to the labeled data. In various cases, the known summaries may be generated by human or another, already trained machine learning system.

In brief, for each second text document, the system processes data representing the second text document using the text summarization neural network and in accordance with current values of the plurality of network parameters to generate a network output that specifies a predicted summary of the second text document. The system then determines, based on a difference between the predicted summary and the known summary, an update to the current values of the plurality of network parameters and then then applies the update to the current network parameter values. In this way, the parameter values learned during pre-training process are adjusted so that they are adapted to the specific text summarization task.

In some implementations, the text summarization neural network includes an encoder network and a decoder network. The encoder and decoder networks each include a subset of the plurality of parameters of the text summarization neural network. The encoder network can encode a network input representing a text document to generate an encoded representation of network input. The decoder network can then process either the network input or the encoded representation of the network input to generate a network output that specifies a corresponding summary of the text document.

Figure 3:
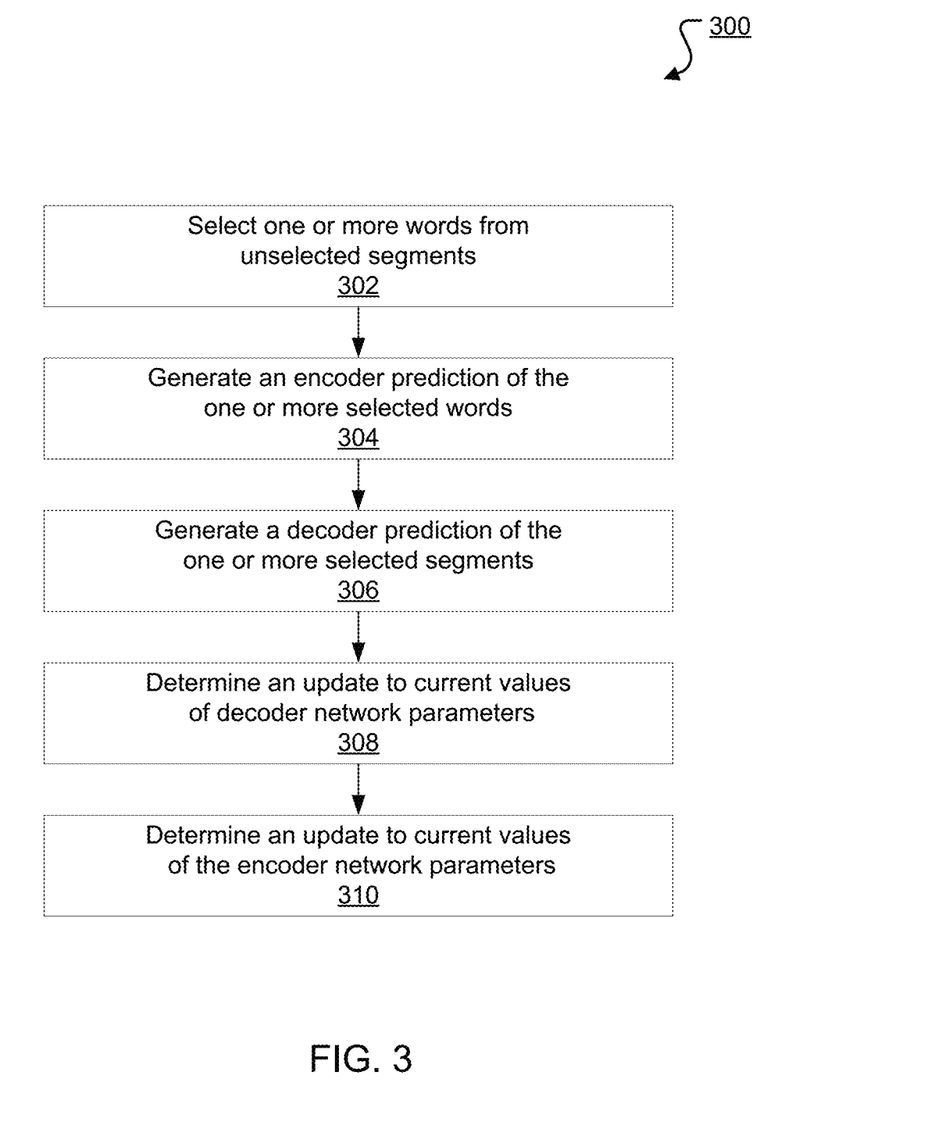
FIG. 3 is a flow diagram of an example process for pre-training a text summarization neural network that includes an encoder and a decoder for a specific use case.

FIG. 3 is a flow diagram of an example process 300 for pre-training a text summarization neural network that includes an encoder and a decoder for a specific use case. For convenience, the process 300 will be described as being performed by a system of one or more computers located in one or more locations. For example, a system, e.g., the system 100 of FIG. 1, appropriately programmed in accordance with this specification, can perform the process 300.

The system selects one or more words from the unselected segments in the unlabeled first text document (302). Specifically, after selecting one or more segments from an unlabeled first text document, the system further selects one or more words from the unselected segments. Selecting the one or more segments is described in more detail above with reference to step 206 from the process 200. The system can also select the one or more words by using similar approaches.

Figure 5:
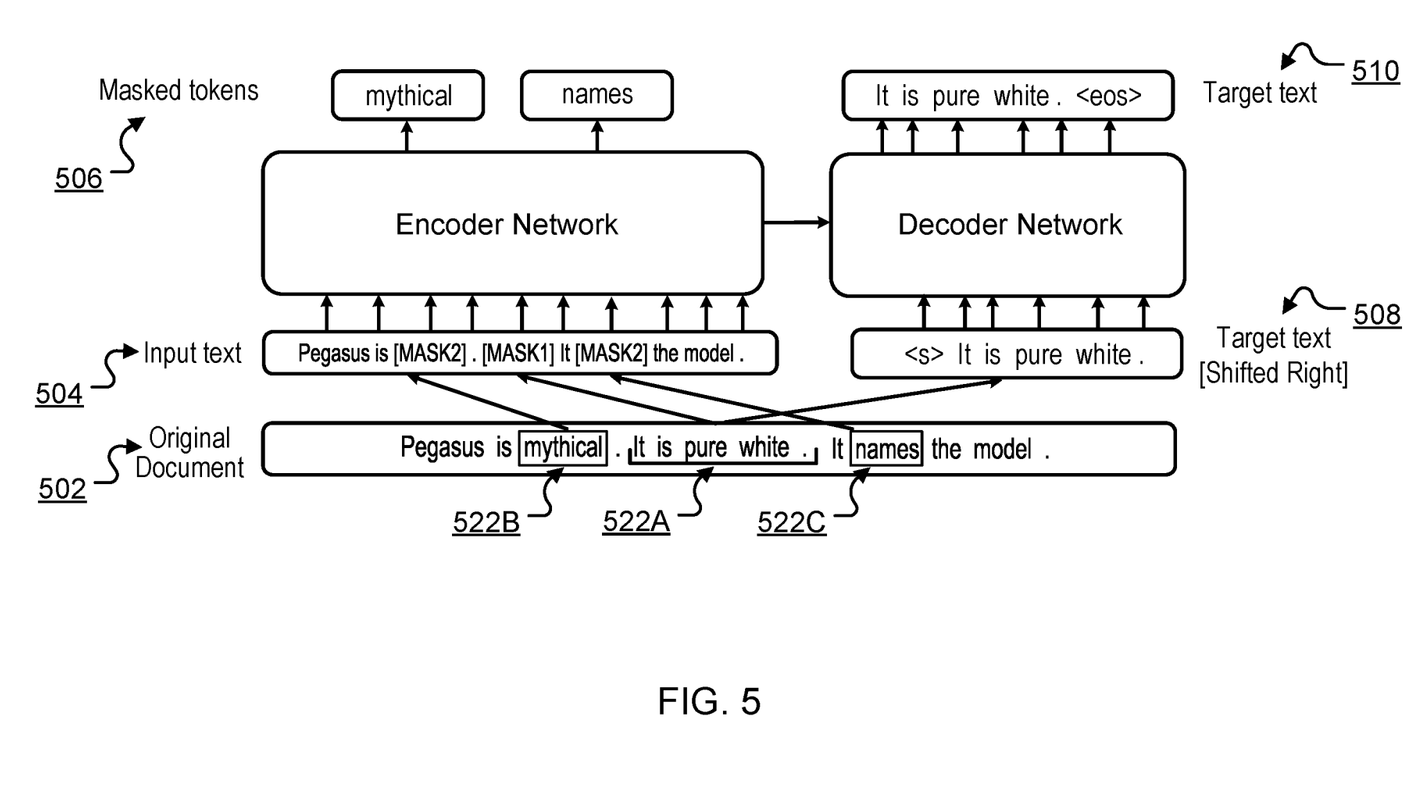
FIG. 5 is an illustration of pre-training a text summarization neural network that includes an encoder and a decoder for a specific use case.

FIG. 5 is an illustration of pre-training a text summarization neural network that includes an encoder and a decoder for a specific use case. In the example of FIG. 5, the system selects a segment 522A and two words 522B-C from an unlabeled text document 502.

The system processes a further masked first text document that excludes (i.e., masks out) (i) the one or more selected segments and (ii) the one or more selected words to generate an encoder prediction of the one or more selected words (304).

To generate the further masked first text document, the system replaces the one or more selected words in the first text document with second mask tokens. The second mask tokens can be either the same or different tokens from the first mask tokens that were used in generating the masked first text document. For example, as shown in FIG. 5, the system generates a further masked first text 504 that (i) masks out the selected segments 522A using first tokens denoted by "MASK1" and (ii) masks out the selected words 522B-C using second tokens denoted by "MASK2".

The system processes data representing the further masked first text document using the encoder network and in accordance with current values of the plurality of encoder network parameters to generate an encoder network output that is an encoded representation of the further masked text document. In particular, the encoder network output includes a respective encoded (i.e., numeric) representation for each of the first and second mask tokens and the unmasked portion in the further masked first text document.

To derive the encoder prediction of the one or more selected words from the encoder network output during the pre-training, the system can make use of a separate prediction model to transduce the encoded representation of the further masked first document into the prediction of the selected words. In other words, in implementations where the text summarization neural network includes an encoder network and a decoder network, the system also use a prediction model that is configured to generate data that specifies a prediction of the one or more selected words based on processing, for example, (i) the respective encoded representations for given masked tokens that correspond to the one or more selected words or (ii) the entire encoder network output. The prediction model is typically configured as a neural network which can be trained either before or during the pre-training of the text summarization neural network.

In the example of FIG. 5, the system processes data representing the further masked first text document 504 using the encoder network and in accordance with current values of the plurality of encoder network parameters to generate an encoder network output 506 from which an encoder prediction of the two selected words 522B-C can be derived.

The system processes a decoder input that is derived from (i) the one or more selected segments and (ii) the encoder network output to generate a decoder prediction of the one or more selected segments (306).

Specifically, the system can shift the data representing the selected sentences right by one decoder input order position, e.g., by introducing a one position offset, so that the decoder network cannot "see" the actual content that it is currently predicting. The system then processes (i) the right shifted data representing the selected segments and (ii) the already generated encoder network output using the decoder network and in accordance with current values of the plurality of decoder network parameters to generate a decoder network output that specifies a decoder prediction of the one or more selected segments.

In the example of FIG. 5, the system processes (i) right-shifted data 508 representing the selected segment and (ii) the encoder network output 506 using the decoder network and in accordance with current values of the plurality of decoder network parameters to generate an decoder network output 510 that specifies an decoder prediction of the selected segments 522A.

The system determines, based on a difference between the decoder prediction and the one or more selected segments, an update to the current values of the plurality of decoder network parameters (308). As similarly described above with reference to step 210 from the process 200, the system can do so by evaluating a first pre-training objective function that measures a difference between the decoder prediction and the one or more selected segments and then determining the update based on a computed gradient of the first pre-training objective function.

The system determines, based on a difference between the encoder prediction and the one or more selected words, an update to the current values of the plurality of encoder network parameters (310). As similarly described above, the system can do so by evaluating a second pre-training objective function that measures a difference between the encoder prediction and the one or more selected words and computing a gradient of the second pre-training objective function with respect to the encoder network parameters, and, optionally, the prediction model parameters. The system then determines, e.g., through backpropagation, the update to the current values of the plurality of encoder network parameters based on the computed gradient. Determining the update also involves backpropagating the computed gradient of the first objective function through the decoder network into the encoder network.

Alternatively, the system can jointly determine the updates to both encoder and decoder network parameters. That is, the system can compute, with respect to the network parameters, a gradient of a pre-training objective function that includes (i) a first term which measures the difference between the decoder prediction and the one or more selected segments and (ii) a second term which measures the difference between the encoder prediction and the one or more selected words.

The system then proceeds to update the current parameter values of the encoder and decoder networks based on the gradients and by using an appropriate gradient descent optimization technique, e.g., stochastic gradient descent, RMSprop or Adam technique.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, wherein the method comprises:
   pre-training a neural network that has a plurality of network parameters to generate a pre-trained neural network, wherein the pre-training comprises:
   obtaining a text document comprising a plurality of text segments;
   determining, for each of the plurality of text segments, an importance score of the text segment that characterizes a relative importance of the segment with respect to other text segments in the text document;
   selecting one or more text segments based on the importance scores;
   generating a masked text document that replaces the one or more text segments in the text document with mask tokens;
   processing, using the neural network and in accordance with current values of the plurality of network parameters, the masked text document to generate a prediction of the one or more text segments; and
   determining, based on a difference between the prediction and the one or more text segments, an update to the current values of the plurality of network parameters; and
   providing the pre-trained neural network for adaptation to perform a specific text processing task using labeled text data.

2. The method of claim 1, wherein determining the importance score of the text segment comprises determining a ROUGE score of the text segment.

3. The method of claim 2, wherein selecting the one or more text segments based on the importance scores comprises:
   selecting one or more text segments that have highest ROUGE scores among the plurality of text segments.

4. The method of claim 2, wherein selecting the one or more text segments based on the importance scores comprises:
   sampling one or more text segments from the plurality of text segments in accordance with the ROUGE scores.

5. The method of claim 1, wherein each mask token comprises predetermined numeric values.

6. The method of claim 1, wherein the neural network comprises a Transformer neural network.

7. A system comprising:
   one or more computers; and
   one or more storage devices storing instructions that, when executed by the one or more computers, cause the one or more computers to perform operations comprising:
   pre-training a neural network that has a plurality of network parameters to generate a pre-trained neural network, wherein the pre-training comprises:
   obtaining a text document comprising a plurality of text segments;
   determining, for each of the plurality of text segments, an importance score of the text segment that characterizes a relative importance of the segment with respect to other text segments in the text document;
   selecting one or more text segments based on the importance scores;
   generating a masked text document that replaces the one or more text segments in the text document with mask tokens;
   processing, using the neural network and in accordance with current values of the plurality of network parameters, the masked text document to generate a prediction of the one or more text segments; and
   determining, based on a difference between the prediction and the one or more text segments, an update to the current values of the plurality of network parameters; and
   providing the pre-trained neural network for adaptation to perform a specific text processing task using labeled text data.

8. The system of claim 7, wherein determining the importance score of the text segment comprises determining a ROUGE score of the text segment.

9. The system of claim 8, wherein selecting the one or more text segments based on the importance scores comprises:
   selecting one or more text segments that have highest ROUGE scores among the plurality of text segments.

10. The system of claim 8, wherein selecting the one or more text segments based on the importance scores comprises:
    sampling one or more text segments from the plurality of text segments in accordance with the ROUGE scores.

11. The system of claim 7, wherein each mask token comprises predetermined numeric values.

12. The system of claim 7, wherein the neural network comprises a Transformer neural network.

13. One or more non-transitory computer-readable storage media storing instructions that when executed by one or more computers cause the one or more computers to perform operations comprising:
pre-training a neural network that has a plurality of network parameters to generate a pre-trained neural network, wherein the pre-training comprises:
obtaining a text document comprising a plurality of text segments;
determining, for each of the plurality of text segments, an importance score of the text segment that characterizes a relative importance of the segment with respect to other text segments in the text document;
selecting one or more text segments based on the importance scores;
generating a masked text document that replaces the one or more text segments in the text document with mask tokens;
processing, using the neural network and in accordance with current values of the plurality of network parameters, the masked text document to generate a prediction of the one or more text segments; and
determining, based on a difference between the prediction and the one or more text segments, an update to the current values of the plurality of network parameters; and
providing the pre-trained neural network for adaptation to perform a specific text processing task using labeled text data.

14. The non-transitory computer-readable storage media of claim 13, wherein determining the importance score of the text segment comprises determining a ROUGE score of the text segment.

15. The non-transitory computer-readable storage media of claim 14, wherein selecting the one or more text segments based on the importance scores comprises:
selecting one or more text segments that have highest ROUGE scores among the plurality of text segments.

16. The non-transitory computer-readable storage media of claim 14, wherein selecting the one or more text segments based on the importance scores comprises:
sampling one or more text segments from the plurality of text segments in accordance with the ROUGE scores.

17. The non-transitory computer-readable storage media of claim 13, wherein each mask token comprises predetermined numeric values.

18. The non-transitory computer-readable storage media of claim 13, wherein the neural network comprises a Transformer neural network.

* * * * *